Patented Feb. 23, 1937

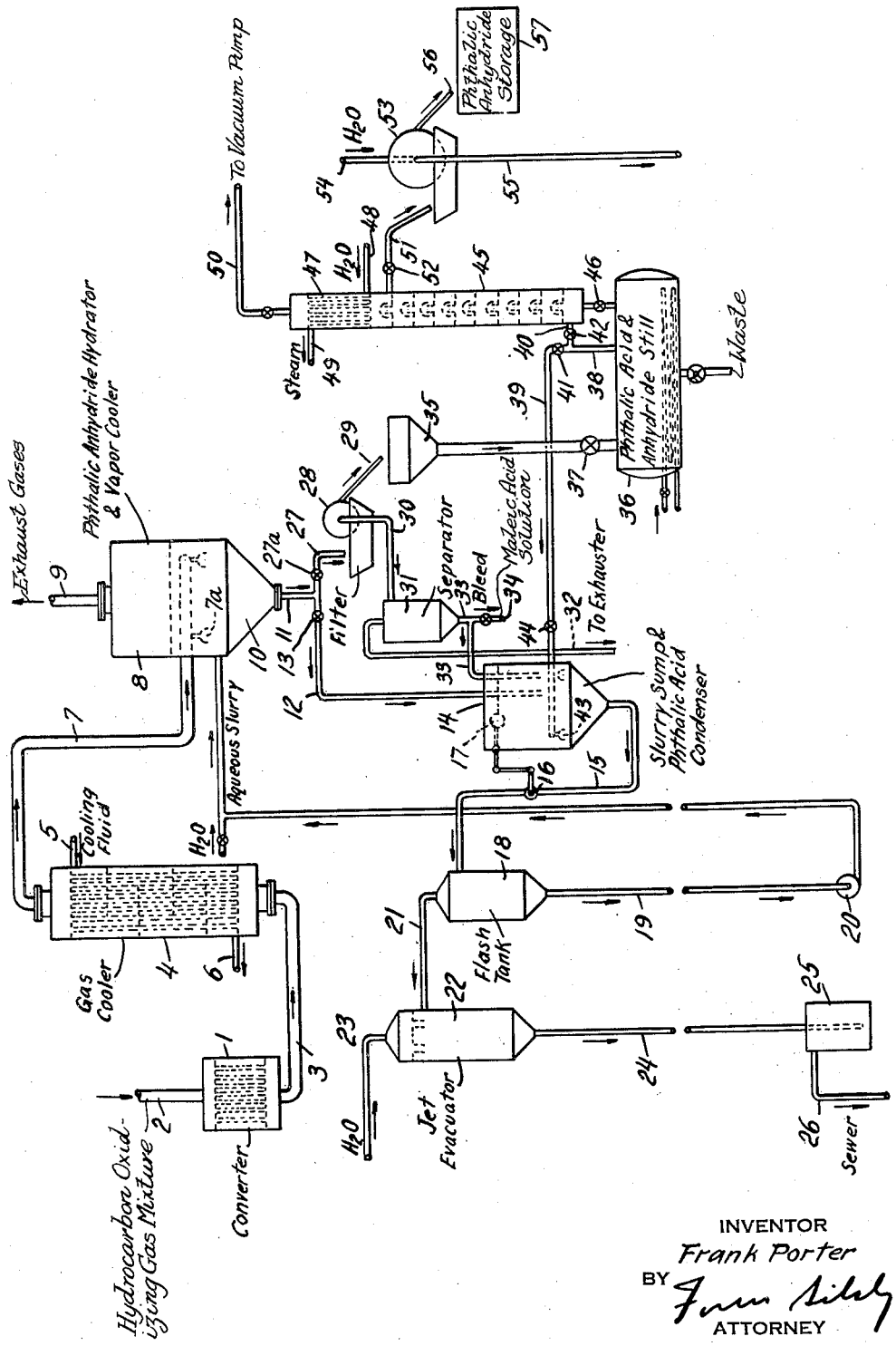

2,071,357

UNITED STATES PATENT OFFICE 2,071,357

RECOVERY OF PHTHALIC ANHYDRIDE OR ACID

Frank Porter, Syracuse, N. Y., assignor to The Solvay Process Company, New York, N. Y., a corporation of New York Application August 22, 1935, Serial No. 37,361

12 Claims. (Cl. 260—123)

This application relates to recovery of phthalic anhydride or acid from the hot reaction gases resulting from the vapor phase oxidation of polynuclear aromatic compounds, e. g. naphthalene, anthracene, and their homologues, and naphtho-quinone.

The separation of phthalic anhydride and maleic anhydride from such reaction gases, as exemplified in the process for the catalytic oxidation of naphthalene by means of air, is normally effected by first cooling the gases, by indirect heat exchange with air or other suitable cooling medium or in some cases by the direct addition of cold air, to lower the temperature of the gases sufficiently to condense out the phthalic anhydride. Most, if not all of the maleic anhydride remains in the gases in vapor phase during the condensation and accordingly the gases are usually scrubbed with some suitable scrubbing medium to remove this product.

The gases may come from the oxidation chamber or converter at a temperature of 400° to 500° C. and when operating at atmospheric pressure phthalic anhydride begins to condense out in solid phase from the gases at around 130° C. This condensation results in the formation of solid phthalic anhydride accumulations which adhere to the walls of the cooling chamber and require periodic or continuous scraping to effect their removal.

The adhesion of phthalic anhydride to the walls of the cooling chamber presents an always annoying and sometimes serious problem. Condensation of the phthalic anhydride under elevated pressure may present greater difficulties than condensation at atmospheric pressure because the dewpoint of phthalic anhydride may be raised considerably above its melting point and a part of the product may be condensed out of the gases as a liquid which upon further cooling tends to adhere with considerable tenacity to the walls of the condenser. Separation of these accumulations of phthalic anhydride may be effected mechanically or manually. Mechanical removal requires relatively complicated apparatus and a correspondingly high initial investment as well as high upkeep costs for power consumption. Manual removal on the other hand requires access to the interior of the condenser, and because of the irritating character of the organic anhydrides upon mucous membranes, presents a serious danger to workmen engaged in their removal. Furthermore, the escape of anhydride vapors into the atmosphere during the process presents a considerable hazard to other persons engaged in working in and around the plant.

It has been proposed to overcome the various difficulties encountered in the above phthalic anhydride condensation methods and to avoid the disadvantages inherent therein by passing hot reaction gases containing phthalic anhydride while yet at a temperature above that at which phthalic anhydride condenses into a cooling chamber wherein they are brought into direct and intimate contact with cooling water which simultaneously cools the gases and separates both phthalic and maleic anhydrides or acids therefrom. By this method the anhydrides are hydrated to the corresponding acids. The temperature and quantity of cooling water may be regulated so that the phthalic acid is removed from the gases either entirely in solution or mainly as a slurry or as both solution and slurry. The above process is the subject matter of U. S. application Serial No. 37,373 of Ralph Lyman Brown filed of even date herewith.

When phthalic acid solution at a temperature between 20° and 40° C. is employed as the cooling medium in the process above described, such a quantity of solution is normally required to cool the gases that the final concentration of phthalic acid in solid phase amounts to only one or two percent of the amount of water present. While this method of operation eliminates to a large extent the disadvantages of prior recovery methods, it has been found that a small percentage of phthalic anhydride passes along with the gases and is not removed in the cooler. This small percentage of phthalic anhydride is not hydrated despite the fact that the gases are passed into intimate contact with the cooling water.

The present invention is based upon the discovery that by employing as cooling medium an aqueous slurry containing a substantially increased concentration of phthalic acid in solid phase a more effective absorption results and the passage of phthalic anhydride through the cooler or absorber may be substantially completely avoided.

Accordingly the process of my invention comprises recovery of phthalic anhydride or acid from hot gases by bringing the hot gases into direct contact with an aqueous phthalic acid slurry, the content of solid phthalic acid in the slurry being maintained above 5%. A content around 15% to 30% of the total slurry is desirable.

The phthalic anhydride-containing gases, prior to contact with cooling slurry, may be precooled to a temperature above that at which solid phthalic anhydride is formed, say above about 135° C. By maintaining the precooler under suitable pressure, a portion of the phthalic acid may be recovered in liquid phase prior to the direct contact cooling step if desired. Alternatively the cooling may be effected entirely in a single step.

The cooler wherein hot phthalic anhydride-containing gases are brought into direct contact with slurry may be of any suitable construction to provide thorough contact between the cooling liquid and the hot reaction gases. For example, it may be a chamber or tower, which may be substantially devoid of packing and provided with spray devices such as spray heads, rotating rolls, discs, or other mechanical agitators arranged for spraying liquid into the gases and against the surfaces of the chamber to vigorously wash the surfaces and prevent adhesion of solid matter thereto, or the cooler may be a simple vessel or tank in which the hot gases bubble up through the liquid therein; submerged packing, screens, or other devices for breaking up the gas stream into a large number of smaller streams or bubbles may be provided. A bubble cap scrubber of the type commonly employed as distillation columns may be used or a scrubber in which the gas is treated with liquid flowing in the same direction as the gas through tubes, nozzles, or the like and the resultant mixture is then passed through a gas liquid separator, may be employed.

Since my process comprehends a substantial reduction in the ratio of cooling water to phthalic acid recovered, suitable means should be provided for removing heat from the system. This may be accomplished by an indirect heat exchanger through which a cooling fluid is passed. The heat exchanger may be embodied in the cooler itself so that the heat is removed from the slurry substantially immediately it is supplied by the hot reaction gases, or a separate cooling device may be provided through which the slurry is circulated. In the latter case evaporation of water from the slurry by application of vacuum may serve to advantage to dissipate the excess heat in the system.

The amount of heat which must be removed from the system will, of course, depend upon the temperature of the gases entering the cooler as well as the total volume of the reaction gas mixture. The rate of circulation of slurry, when an external cooler is employed, will depend in part upon these factors and further upon the temperature drop obtainable in the cooler.

I have made the further discovery that in carrying out this process, it is advantageous to maintain the temperature of the phthalic acid slurry in the cooler between about 50° C. and about 60° C. At temperatures materially below 50° C. the product formed apparently is present in such finely divided condition that a portion thereof passes on through the cooler whereas at temperatures above about 60° C. the rate of hydration is slower and there is a possibility of incomplete hydration, again with the result that a portion of the product may pass through the cooler.

A portion of the cooling liquid containing phthalic acid in solid phase, may be continuously or intermittently removed from the cooler, and the solid phthalic acid may be mechanically separated from liquid by filtration or decantation, either centrifugal or gravitational. The phthalic acid, after separation of liquid therefrom, may be dehydrated, for example by fractional distillation, to form phthalic anhydride, and the product may be purified in any suitable manner. The main part of the liquid resulting from the mechanical separation may be returned to the cooler.

As will be apparent to those skilled in the art, the cooling of hot reaction gases from the catalytic conversion of polynuclear aromatic compounds to phthalic anhydride by the process of the present invention results in the conversion of substantially all of the maleic anhydride present in the gases to maleic acid solution. In view of the comparatively small quantity of the maleic acid present and its relatively high solubility, this product is retained in solution. During the process a part of the cooling liquid may be bled off, the bleed-off being controlled so as to maintain the maleic acid concentration of the liquid in the system below that of saturation at the temperature at which phthalic acid is removed, thus avoiding contamination of the phthalic acid product by maleic acid crystals. The liquor bled off may be treated for recovery of maleic acid and any dissolved phthalic acid or may be otherwise disposed of.

In order that a better understanding of the process of my invention may be had, the following illustration is given with particular reference to the accompanying drawing wherein one embodiment of the invention is shown diagrammatically.

In the drawing, numeral 1 designates a catalytic converter containing a suitable oxidation catalyst such as vanadium oxide and having an inlet conduit 2 and an outlet conduit 3 which leads to a preliminary cooler 4. The cooler 4, as illustrated, has an inlet 5 and an outlet 6 for introduction and removal of a suitable cooling fluid. From the end of cooler 4 opposite conduit 3, a conduit 7 leads to a cooling chamber 8.

As illustrated, the cooling chamber 8 comprises a shell adapted to contain a liquid and having gas outlet conduit 9 at the top thereof and a sloped bottom 10 to permit withdrawal of slurry through outlet conduit 11 without substantial separation of solid from liquid. Inlet conduit 7 is provided with a suitable distributor 7a for uniformly distributing the gases beneath the surface of liquid in the cooler. In some cases it may be desirable to provide insulation or steam jacketing around the exterior of the portions of conduit 7 within the cooler in order to avoid cooling of this conduit to such an extent that phthalic anhydride would condense on the interior surfaces of the conduit and cause clogging.

From outlet conduit 11 a pipe 12 provided with a valve 13 leads to a slurry sump 14 which may to advantage be constructed similarly to cooler 8 for reasons to be hereinafter more fully set forth. From sump 14 a liquid withdrawal pipe 15 having a valve 16, which may be controlled by any suitable actuating means to maintain a constant liquid level in the the sump, for example a float 17, leads to a flash tank 18. From the bottom of the flash tank 18 a liquid return pipe 19, having a pump 20 thereon, leads to the cooler 8. A suitable water inlet may be provided on line 19. From the top of the flash tank a vapor line 21 leads to a suitable evacuating means which, as shown in the drawing, may be a jet evacuator 22 having a water inlet 23 at the top thereof and a liquid outlet 24 at the bottom thereof. The outlet 24 may be sufficiently long to permit flow of liquid therethrough in opposition to air pressure or a pump may be provided for drawing it through this line. At the bottom of pipe 24 a liquid seal 25 with outlet 26 for suitable liquid disposal is illustrated.

Outlet conduit 11 from the direct contact cooler 8 is shown provided with a second withdrawal pipe 27 having a valve 27a thereon. Withdrawal pipe 27 leads to suitable separating means, such as a drum filter 28. The drum filter is provided with the customary doctor 29 for scraping solid therefrom and with a liquid outlet 30 leading to a separator 31 for eliminating entrained air. An air line 32 from the separator leads to a suitable exhauster, not shown, for supplying suction to the filter 28. At the bottom of separator 31 a liquid withdrawal pipe 33, having a valved branch 34 is shown. Pipe 33 leads to the sump 14 for return of liquid from the filter to the cooling system. The branch 34 is a bleed off for maleic acid solution. Doctor 29 of the drum filter is arranged so as to conduct solid phthalic acid to a hopper 35 on the phthalic acid still 36. The hopper 35 may be provided with a suitable star valve 37 or other suitable means for controlling introduction of phthalic acid into the still 36.

The phthalic acid still may be of any convenient construction and is shown as a simple distillation vessel provided with a heating coil 36a. It preferably should be suitably insulated to avoid heat loss and promote uniformity of operation. The still has a vapor offtake 38 with a branch 39 and a branch 40. These branches are equipped with valves 41 and 42. Branch 39 leads to the phthalic acid slurry sump 14 through a suitable distributor 43. The line 39 also may be provided with a check valve 44 for preventing back flow of liquid from the slurry sump to the phthalic acid still. Branch 40 leads to the base of a rectification column 45.

Column 45 may be of any suitable construction, such as a plate column or a bell and tray column, and has at the bottom thereof a valved liquid return line 46 and at the top a suitable heat exchanger 47 which may be provided with a liquid inlet 48 and outlet 49. This heat exchanger may be in the nature of a waste heat boiler, water being introduced at 48 and steam being withdrawn at 49. By controlling the steam pressure, the temperature at the top of the column may be regulated. A vacuum connection 50 is provided at the top of the column. From the top plate of the column a liquid withdrawal line 51 having valve 52 is provided for the withdrawal of phthalic anhydride. This withdrawal line may lead to apparatus for placing the phthalic anhydride in suitable physical condition for transportation or use or may lead to further purification apparatus as desired. As shown in the drawing, it conducts liquid phthalic anhydride to a flaker 53 having an inlet and outlet 54 and 55 for cooling water and a doctor 56 for scraping solid phthalic anhydride from the drum and conducting it to a storage bin 57.

The system above described may be operated for the preparation of phthalic anhydride by air oxidation of naphthalene in the following manner:—

A mixture of naphthalene vapor and air in a molar or volume ratio of around 1:130, preheated to a temperature around 350° C., enters converter 1 through inlet 2 at a pressure around 3 atmospheres absolute. The naphthalene is oxidized to phthalic anhydride with the formation of small percentages of maleic anhydride, carbon dioxide, and water vapor. The hot reaction gases pass at a temperature around 400° C. to 500° C. through the converter outlet conduit 3 into the gas cooler 4 where they are cooled by indirect heat exchange with a suitable cooling fluid, either gaseous or liquid, entering at 5 and leaving at 6, to a temperature around 200° C. At this temperature they pass through conduit 7 and distributor 7a into the direct contact cooler 8 at a point well below the surface of a body of phthalic acid slurry in water, containing around 15% to 30% of solid phthalic acid as crystalline slurry and maintained at a temperature between about 50° C. and about 60° C. The gases bubble up through the body of liquid and are cooled thereby to about the temperature of the cooling liquid. Phthalic anhydride reacts with the water to form phthalic acid and is retained in the cooling liquid in crystalline form. Any maleic anhydride or maleic acid present in the gases is simultaneously absorbed or dissolved and retained in the solution.

The gases freed from phthalic anhydride and maleic anhydride or maleic acid pass through outlet 9 while yet at a pressure above about 2 atmospheres absolute and may be conducted to suitable disposal means. Phthalic acid slurry in withdrawn through outlet pipe 11 and pipe 12 to the sump 14 and passes thence through pipe 15 to flash tank 18 maintained under vacuum by means of the jet evacuator 22. Resultant evaporation of water from the solution may cool the slurry to around 20° to 40° C. and this cooled slurry is returned via pipe 19 to the body of liquid in cooler 8 where it mingles with the slurry contained therein. The amount of liquid passing through this circuit may be controlled by the pump 20 so that a substantially constant temperature of about 50° C. to 60° C. is maintained in the body of liquid in cooler 8. A small portion of the liquid withdrawn through outlet 11, say 1% to 5% thereof, is withdrawn through outlet pipe 27 to a drum filter 28 where liquid is separated from solid by suction, liquid passing through pipe 30 to air separator 31. The suction is maintained on the filter by an exhauster, not shown, connected to line 32. The main portion of this liquid, free from solid phthalic acid, is returned via pipe 33 to the sump 14. A minor portion thereof may be bled off through bleed line 34 for recovery of maleic acid from solution or for other suitable disposal, the amount of bleed being controlled so that maleic acid will not be present in the solution or slurry in cooler 8 in sufficient quantity to exist in solid phase under the conditions of filtration. Solid phthalic acid collects on the drum filter and is scraped therefrom by doctor 29 and conducted to hopper or bin 35 from whence it may be passed through valve 37 into a phthalic acid still 36.

The still illustrated is designed for intermittent operation and the hopper 35 provides storage for phthalic acid while a preceding charge is being treated in the still. When sufficient phthalic acid has been introduced into still 36 to constitute a charge therefor, the introduction of additional acid through valve 37 is discontinued and steam is passed through coil 36a to dehydrate the phthalic acid. During this operation the valves on lines 40 and 46 are kept closed and valve 41 is opened so that vapors from the still pass through conduits 38 and 39 to distributor 43 within the slurry sump 14. Here the vapors bubble up through the slurry with the result that they are washed free from any phthalic acid which may be contained in the vapor. When the charge of phthalic acid is completely dehydrated (to phthalic anhydride), which may be indicated by rise of temperature in the still appreciably above 190° C. when the still is operated at approximately atmospheric pressure, valve 41 is closed and the valves on line 40 and line 46 are opened so that vapors may pass from the still up through column 45 and reflux liquid may return through 46 to the still. The temperature in the still is then further raised and vacuum is applied through connection 50 to reduce the pressure to around 1.7 pounds absolute in the column. Phthalic anhydride vapors pass up through column 45 and are rectified by countercurrent contact with phthalic anhydride condensate formed in the condenser 47. The temperature at the top tray of the column is controlled by suitable adjustment of the cooling fluid in condenser 47 so that a substantially pure phthalic anhydride product may be withdrawn in liquid phase through outlet 51. Thus a temperature of about 200° C. may be maintained at the top of the column and the withdrawal of phthalic anhydride may be regulated so as to provide ample reflux liquid to flow down through the column. The liquid phthalic anhydride withdrawn may be passed to a flaker 53 and cooled and solidified as a film by indirect heat exchange with cooling water passing through the drum of the filter, the film of phthalic anhydride being scraped from the drum by doctor 56 and conducted to a suitable storage container 57.

It will be understood that with a substantial proportion of water vapor in the gases more or less of the maleic or phthalic anhydrides may be present in the form of acid especially if the gases are cooled to a temperature approaching the dewpoint for these constituents prior to the direct contact cooling step above described. Hence my invention comprehends recovery of acid as well as anhydride by the method described.

I claim:

1. The method of removing phthalic anhydride or acid from hot gases containing vapors thereof, which comprises passing the hot gases into direct contact with an aqueous slurry containing more than 5% solid phthalic acid.

2. The method of removing phthalic anhydride or acid from hot gases containing vapors thereof, which comprises passing the hot gases into direct contact with an aqueous slurry of solid phthalic acid which slurry is at a temperature between about 50° and about 60° C.

3. The method of removing phthalic anhydride or acid from hot gases containing vapors thereof, which comprises passing the hot gases into direct contact with an aqueous slurry which is at a temperature between about 50° and about 60° C., and which contains more than 5% solid phthalic acid.

4. The method of removing phthalic anhydride or acid from hot gases containing vapors thereof, which comprises passing the hot gases into direct contact with an aqueous slurry which is at a temperature between about 50° and about 60° C., and which contains between 15% and 30% solid phthalic acid.

5. The method of removing the phthalic anhydride product from the hot gases resulting from the vapor phase partial oxidation of polynuclear aromatic compounds, which comprises bringing a stream of the hot reaction gases, while yet at a temperature above the condensation temperature of phthalic anhydride or acid in solid phase, into intimate contact with an aqueous slurry containing between 15% and 30% solid phthalic acid.

6. The method of removing the phthalic anhydride product from the hot reaction gases resulting from the vapor phase partial oxidation of polynuclear aromatic compounds, which comprises bringing a stream of the hot reaction gases while yet at a temperature above about 135° C. into intimate contact with an aqueous slurry containing between 15% and 30% solid phthalic acid and maintained at a temperature between about 50° C. and about 60° C.

7. The method of removing the phthalic anhydride product from the hot reaction gases resulting from the vapor phase partial oxidation of polynuclear aromatic compounds, which comprises bringing a stream of the hot reaction gases while yet at a temperature around 200° C. into intimate contact with an aqueous slurry containing between 15% and 30% solid phthalic acid and maintained at a temperature between about 50° C. and about 60° C.

8. The method of removing phthalic anhydride or acid from hot gases containing vapors thereof, which comprises passing the hot gases into direct contact with an aqueous slurry containing more than 5% solid phthalic acid, withdrawing a portion of the slurry from contact with the gases, cooling it and returning it to the direct contact step at a rate regulated to maintain the slurry in contact with the gases at a temperature between about 50° C. and about 60° C., and withdrawing a portion of the slurry for phthalic acid recovery at a rate regulated to maintain the high concentration of solid phthalic acid in the direct contact step.

9. The method of removing the phthalic anhydride product from the hot reaction gases resulting from vapor phase partial oxidation of polynuclear aromatic compounds, which comprises bringing a stream of the hot reaction gases while yet at a temperature around 200° C. and above about two atmospheres absolute pressure into intimate contact with an aqueous slurry containing between 15% and 30% solid phthalic anhydride, withdrawing a portion of the slurry from contact with the gases, releasing pressure thereon to effect evaporation of water and cooling of the slurry, returning the cooled slurry to the direct contact step at a rate regulated to maintain the slurry in contact with the gases at a temperature between about 50° C. and about 60° C., and withdrawing a portion of the slurry for phthalic acid recovery at a rate regulated to maintain the high concentration of the solid phthalic acid in the direct contact step.

10. The method of removing the phthalic anhydride product from the hot reaction gases resulting from the vapor phase partial oxidation of polynuclear aromatic compounds, which comprises bringing a stream of the hot reaction gases while yet at a temperature above about 135° C. into intimate contact with an aqueous phthalic acid slurry which is at a temperature between about 50° C. and about 60° C.

11. The method of removing phthalic and maleic anhydrides and acids from hot gases containing vapors thereof, which comprises passing the hot gases into direct contact with an aqueous slurry containing more than 5% solid phthalic acid, withdrawing a portion of the slurry from contact with the gases, cooling it and returning it to the direct contact step at a rate regulated to maintain the slurry in contact with the gases at a temperature between about 50° C. and about 60° C., withdrawing a portion of the slurry for phthalic acid recovery at a rate regulated to maintain the high concentration of solid phthalic acid in the direct contact step, and bleeding a portion of the aqueous liquid from the system and removing maleic acid therefrom.

12. The method of removing phthalic and maleic anhydrides and acids from hot gases containing vapors thereof, which comprises passing the hot gases into direct contact with an aqueous slurry containing more than 5% solid phthalic acid, withdrawing a portion of the slurry from contact with the gases, cooling it and returning it to the direct contact step at a rate regulated to maintain the slurry in contact with the gases at a temperature between about 50° C. and about 60° C., withdrawing a portion of the slurry for phthalic acid recovery at a rate regulated to maintain the high concentration of solid phthalic acid in the direct contact step, mechanically separating solid from liquid, and bleeding a portion of the aqueous liquid from the system and removing maleic acid therefrom, the bleed being regulated so as to maintain in dissolved phase the maleic acid content of the aqueous slurry subject to mechanical separation for recovery of solid phthalic acid.

FRANK PORTER.